United States Patent [19]
Bouquet

[11] 4,008,695
[45] Feb. 22, 1977

[54] COOLED INTEGRAL VALVE CHEST FOR AN INTERNAL COMBUSTION ENGINE AND METHOD FOR MAKING SAME

[75] Inventor: Jean-Claude Bouquet, Pantin, France

[73] Assignee: Societe d'Etudes de Machines Thermiques, Saint Denis, France

[22] Filed: Jan. 13, 1975

[21] Appl. No.: 540,502

[30] Foreign Application Priority Data
Jan. 29, 1974 France .............................. 74.02900

[52] U.S. Cl. .......................... 123/41.76; 123/41.41; 123/188 GC; 123/41.85
[51] Int. Cl.² ........................................... F01P 3/12
[58] Field of Search ............. 123/188 VA, 188 GC, 123/41.31, 41.41, 41.76, 41.77, 41.85

[56] References Cited
UNITED STATES PATENTS
2,967,518  1/1961  Zuhn .......................... 123/188 GC
3,353,522  11/1967  Ley ................................. 123/41.31

Primary Examiner—Charles J. Myhre
Assistant Examiner—Daniel J. O'Connor
Attorney, Agent, or Firm—Kenyon & Kenyon Reilly Carr & Chapin

[57] ABSTRACT

An integrally moulded overhead valve chest for an internal combustion engine, comprising a cage having several arms and formed with an annular valve seat cooling chamber and a valve stem guide formed with an annular guide cooling chamber which communicates with said seat cooling chamber through at least one duct formed within one arm, wherein the improvement consists in at least one hole extending through the radially outer wall of one of said cooling chambers and stopped or closed off by a welded or brazed plug.

11 Claims, 6 Drawing Figures

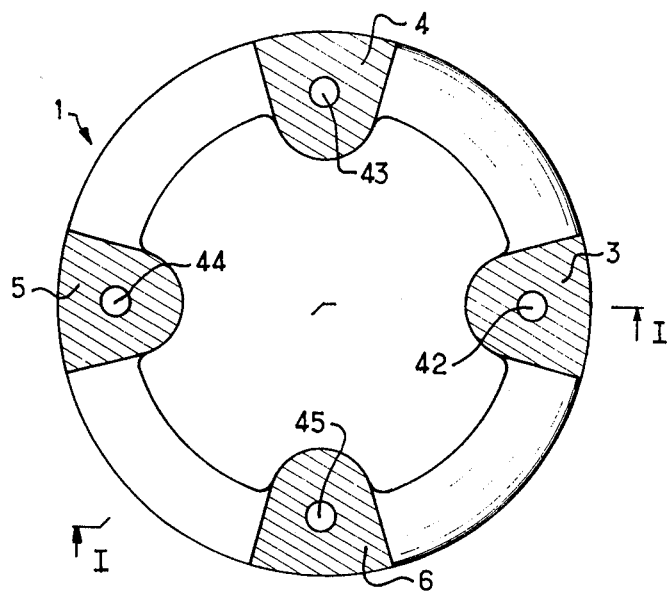
*Fig: 3.*
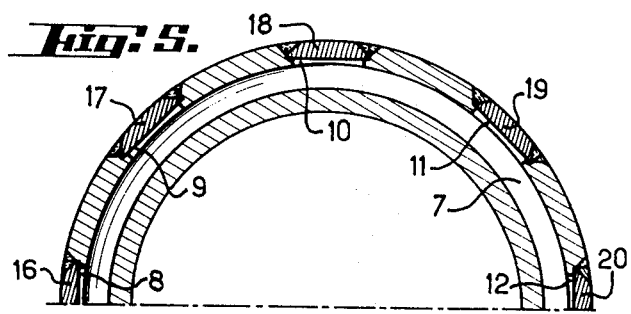
*Fig: 5.*
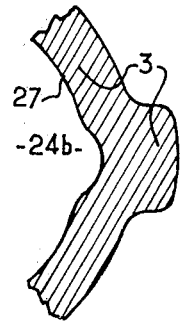
*Fig: 4.*
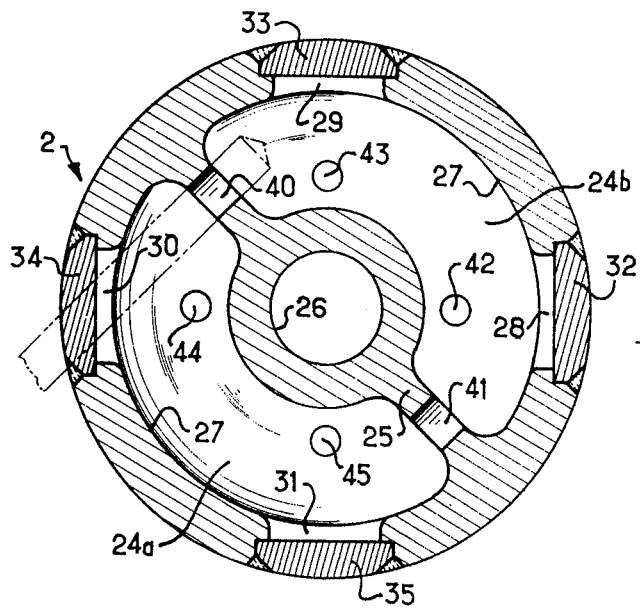
*Fig: 6.*

COOLED INTEGRAL VALVE CHEST FOR AN INTERNAL COMBUSTION ENGINE AND METHOD FOR MAKING SAME

The present invention relates to an integrally moulded cooled valve chest or box for an internal combustion engine as well as to a method of manufacturing this chest by moulding or casting same.

It is known to provide in the constructions of internal combustion engines and more particularly in that of Diesel engines valve chests which are accommodated or housed within the engine cylinder-head. The valves essentially of the overhead type are fitted into said chests.

In the prior art such chests are in particular of the integrally moulded type. On the other hand it is necessary to cool both of the valve seat and stem guide. Thus in some known constructions there are two annular cooling chambers, namely one for the valve seat and the other for the valve stem guide.

As a rule these chambers are cast with a chest according to a process making use of cores provided in the casting mould proper.

The valve stem guide cooling chamber has been made heretofore by using two cores forming a kind of circular ring defining two compartments separated from but communicating with each other. Likewise the valve seat cooling chamber is made in two parts forming a circular ring also by means of a pair of cores for instance. In such a case after the casting operation the connection between both parts is achieved by welding for instance.

The constructions of such chambers and accordingly valve chests of the prior art as well as the methods of making same involve substantial inconveniences which are overcome by the present invention.

The object of the present invention is indeed to provide an overhead valve chest for an internal combustion engine, said chest being of the integrally moulded type comprising: a cage with several webs or arms which is formed with an annular valve seat cooling chamber; and a valve stem guide which is formed with an annular guide cooling chamber communicating with said valve seat cooling chamber through at least one duct or passageway formed in at least one of said webs or arms, said chest being characterized in that it comprises at least one hole extending through the radially outer wall of one of said cooling chambers, said hole being stopped out or closed off by a welded or brazed plug or patch.

Thus the valve chest according to the invention comprises for instance holes located at the chest cage and others located at the valve stem guide. As stated hereinabove these holes are closed off or stopped out in order to provide the chest in its final shape.

These holes indeed result from casting operations.

Another object of the invention is therefore a method of manufacturing a valve chest through moulding or casting, said method being characterized by the steps consisting in:

providing a pattern for casting and the cores corresponding to said cooling chambers to be made;

providing a mould and positioning said cores therein while holding or supporting them in those areas of said mould which correspond to the locations of said holes to be provided;

casting the molten or fused metal into said mould; then stripping the casting; removing said cores and cleaning the rough casting thus obtained through at least some of said holes.

It is thus seen that the cores arranged with a view to make both chambers are kept in position within the mould by means of supports or holders located at the positions of the holes which would be provided when the casting step will have been completed. It should be pointed out that according to the characterizing features of the method of casting according to the invention the cooling chambers are made by positioning a number of cores different from that used in the prior art. The supports or holders for these cores are also removed after the casting step thereby enabling to provide the aforesaid holes.

The invention will be better understood and further objects, characterizing features, details and advantages thereof will appear more clearly as the following explanatory description proceeds with reference to the accompanying diagrammatic drawings given by way of non-limitative example only illustrating a presently preferred form of embodiment of the invention and wherein:

FIG. 3 is a view in cross section taken upon the line III—III in FIG. 1;

FIG. 4 is a cross section taken upon the line IV—IV in FIG. 1;

FIG. 5 is a half cross section taken upon the line V—V in FIG. 2; and

FIG. 6 is a view in cross section taken upon the line VI—VI in FIG. 1.

FIG. 1 shows a valve chest according to the invention essentially comprising a cage 1 and a valve stem guide 2. The cylinder-head proper as well as the valve to be fitted into the valve chest are not shown.

Figure 2:
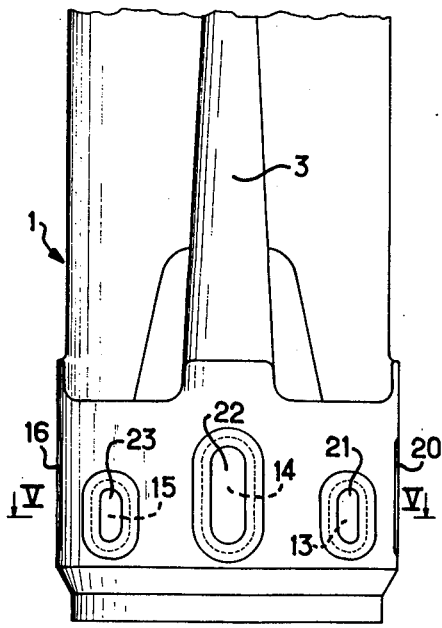
FIG. 2 is an outside elevational view seen in the direction of the arrows II in FIG. 1 with parts broken away at the upper portion.
Figure 1:
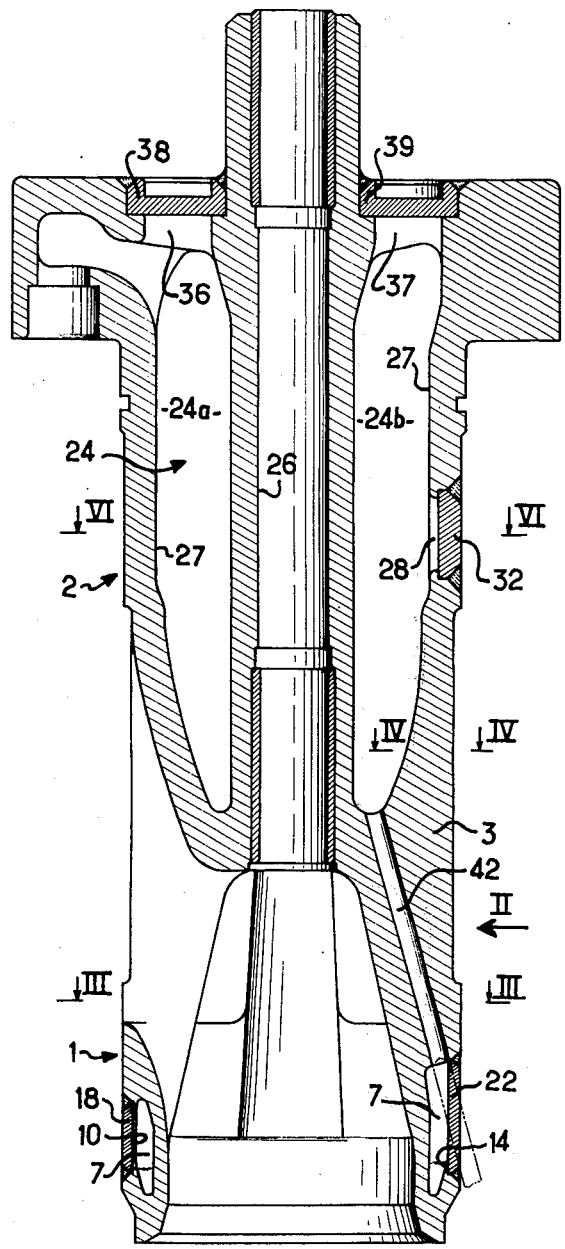
FIG. 1 is a view of the valve chest in longitudinal section taken upon line I—I in FIG. 3 with parts broken away at the lower portion.

The cage 1 has several webs or arms (for instance four in number) 3, 4, 5 and 6 (FIG. 3). It also includes an annular valve seat cooling chamber 7. The cage 1 moreover comprises eight holes numbered 8 to 15 (FIGS. 2 and 5) which are closed off or stopped out through welding or brazing by means of patches or plugs designated by the reference numerals 16 to 23, respectively.

The valve stem guide 2 comprises an annular chamber 24 consisting of two compartments 24a and 24b separated from each other by a longitudinal partition wall 25 which extends radially between the inner and outer cylindrical walls 26 and 27. Holes 28, 29, 30 and 31 extend through the outer wall 27 of the valve stem guide cooling chamber 24. These holes are closed off or stopped out by means of plugs 32, 33, 34 and 35, respectively. Openings 36 and 37 of substantially semi-circular section are formed in the top face or upper end wall of the chest and are also stopped out or closed off by plugs 38 and 39.

The partition 25 is formed with two holes 40 and 41 thereby providing communication between the compartments 24a and 24b of chamber 24.

Ducts or like passageways 42, 43 and 45 (FIGS. 3 and 6) are provided in the webs 3, 4, 5 and 6, respectively, to provide communication between both chambers 7 and 24. Thus a cooling fluid may be caused to flow properly through the chambers 24 and 7 successively to effect a satisfactory cooling of the valve seat area and of the valve stem guide area.

The chest according to the invention is made through a casting process which may be practised in the following manner.

At first there should be provided a pattern generally made from wood and adapted to be used for making a cavity in the sand of the mould. At the same time are also provided the cores for defining both cooling chamber 7 and 24 to be obtained.

Then the mould is prepared and the cores are positioned therein according to a well defined arrangement. The cores are held or supported within the mould proper.

In those portions of the mould adapted to define the cage 1, the cores are supported in areas which correspond to the holes 8 to 15, respectively, to be obtained.

In that portion of the mould which is adapted to define the valve stem guide the cores are kept in position within areas which correspond to the holes 28 to 31, respectively, to be achieved. Moreover cores are also positioned at locations corresponding to the openings 36 and 37 to be provided. The casting of the molten metal into the mould may then be effected and afterwards the casting is stripped.

After having removed the core supports or holders the cores proper may be removed by passing them through at least some of the holes 8 to 15, 28 to 31, 36 and 37 which have thus been obtained through the moulding operating step.

At this manufacturing stage of the valve chest according to the invention both chambers 7 and 24 provided after withdrawal of the cores do not communicate with each other; moreover the chamber 24 then consists of two compartments 24a and 24b which do not communicate with each other.

Now the holes 8, 10, 12 and 14 (FIG. 5) are located at the webs 3, 4, 5 and 6, respectively. It is then possible to insert through these holes the end portions of drilling tools such as drills or bits so as to successively drill through the ducts 42, 43, 44 and 45 in each one of the webs. Through the holes 30 and 31 for instance are also drilled the ducts or passageways 40 and 41 extending through the longitudinal partition wall 25. Thus the communication between both chambers 7 and 24 is then achieved.

All the holes are then stopped out or closed off with patches or plugs such as 32 welded or brazed onto the chest proper.

Thus the chest made according to the invention exhibits a pair of annular cooling chambers communicating with each other and providing a good cooling of the valve seat as well as of the valve stem guide. On the other hand such a valve chest comprises a series of holes subsequently stopped out or closed off which are drilled during the manufacture of this chest according to the casting process described hereinabove. These holes serve as stated hereinabove in particular for the withdrawal of the cores after the casting operation and also for drilling the communication ducts or passageways.

It should be understood that the invention is not at all limited to the form of embodiment described and shown which has been given by way of example only. In particular it comprises all the means constituting technical equivalents of the means described as well as their combinations if same are carried out according to the gist of the invention and used within the scope of the appended claims.

What is claimed is:

1. An overhead valve chest for an internal combustion engine, said chest being of the integrally molded type comprising a cage including several depending arms, an annular valve seat cooling chamber; and a valve stem guide formed with an annular cooling chamber for said guide, at least one duct formed in at least one of said arms and providing communication between said last-named chamber and said valve seat cooling chamber, wherein the improvement comprises at least one hole extending through a radially outer wall of one of said cooling chambers and permanent plug means closing off said hole, each said duct formed in said arms being substantially straight and at least one aforesaid hole being located adjacent said cage at at least one of said arms, such hole having such dimensions and size that the projection of the visible contour of the orifice through which one of these ducts opens opens from said valve seat cooling chamber into the radially outer wall surface of said last-named chamber in the direction of the longitudinal center line of such duct is contained within said hole.

2. A valve chest according to claim 1, wherein said valve stem guide cooling chamber is formed between a radially outer cylindrical wall and a radially inner cylindrical wall and comprises a longitudinal partition extending radially between said inner and outer walls, said partition dividing said valve stem guide cooling chamber into at least two compartments, said chest being characterized in that at least one aforesaid hole extends through said outer wall of said valve stem guide cooling chamber and is such that geometrical projection of its contour onto said partitition does not intersect a sleeve forming the valve stem guide.

3. A valve chest according to claim 2, characterized in that said longitudinal partition includes at least one duct providing communication between said compartments of said valve stem guide cooling chamber.

4. A valve chest according to claim 1 characterized in that at least one aforesaid hole is of substantially semicircular section and formed in the top end wall of said chest.

5. An overhead valve chest capable of being removably fitted as an insert in a cylinder head of an internal combustion engine, said chest being integrally cast in one piece and adapted to accommodate one single valve, and comprising: a cage portion having several depending arms; an annular valve seat portion interconnecting said arms endwise, said valve seat portion being formed with an endless annular valve seat cooling chamber surrounding the center line axis of said valve chest; and a valve stem guide portion formed with and surrounded by an annular cooling chamber; at least one duct formed in at least one of said arms and extending between said valve seat cooling chamber and said valve stem guide cooling chamber, said duct opening into said chambers with its opposite ends, respectively, to provide a permanent communication between said chambers; the radially outer wall of at least one of said cooling chamber being formed with at least one hole extending therethrough and a welded plug closing off said hole.

6. A valve chest according to claim 5, wherein each aforesaid duct consists of a substantially straight bore and at least one aforesaid hole is located on said cage in substantially registering relation to that arm which is formed with said duct, said hole having such a shape and size that the projection of the visible contour of the orifice, through which said duct opens into said valve seat cooling chamber, onto the radially outer wall surface of said last-named chamber in the direction of the longitudinal center line of said duct, is contained within said hole.

7. A valve chest according to claim 5, wherein said valve stem guide cooling chamber is defined between a radially outer cylindrical wall and a radially inner cylindrical wall; said inner cylindrical wall being hollow and forming the valve stem guide; said guide cooling chamber surrounding said guide portion comprising a longitudinal partition extending diametrically between said inner and outer cylindrical walls and dividing said guide cooling chamber into two compartments, said outer cylindrical wall being formed with at least one aforesaid hole extending therethrough which has such a position, shape and size that the geometrical projection of its contour onto and at right angles to said partition does not intersect said inner cylindrical wall.

8. A valve chest according to claim 7, wherein said partition is formed with at least one passageway providing communication between said compartments of said guide cooling chamber.

9. A valve chest according to claim 8, wherein said passageway consists of a bore having such a position and size that it is contained within said geometrical projection of said hole extending through said outer cylindrical wall of said guide cooling chamber.

10. A valve seat according to claim 5, wherein said valve stem guide portion is provided with a transverse top end wall limiting said guide cooling chamber, said top end wall being formed with at least one hole of substantially semicircular section adjacent to said guide portion while being located radially outwards therefrom, and a welded plug closing off said last-named hole.

11. A valve chest according to claim 5, wherein each aforesaid plug is fitted into its corresponding hole in substantially flush relation to the outer surface of its said radially outer wall.

* * * * *

UNITED STATES PATENT AND TRADEMARK OFFICE
CERTIFICATE OF CORRECTION

PATENT NO. : 4,008,695
DATED : February 22, 1977
INVENTOR(S) : Jean-Claude Bouquet It is certified that error appears in the above-identified patent and that said Letters Patent are hereby corrected as shown below:

The correct name of the Assignee is:

Societe d'Etudes de Machines Thermiques-S.E.M.T.

Signed and Sealed this

Twenty-sixth Day of April 1977

[SEAL]

Attest:

RUTH C. MASON
*Attesting Officer*

C. MARSHALL DANN
*Commissioner of Patents and Trademarks*